United States Patent [19]

Mohn

[11] Patent Number: 4,901,629
[45] Date of Patent: Feb. 20, 1990

[54] SEALING ARRANGEMENT

[75] Inventor: Frank Mohn, London, England

[73] Assignee: Framo Developments (UK) Limited, London, England

[21] Appl. No.: 264,363

[22] Filed: Oct. 31, 1988

[30] Foreign Application Priority Data

Oct. 30, 1987 [GB] United Kingdom ............... 8725449

[51] Int. Cl.$^4$ ............................................. F02F 7/00
[52] U.S. Cl. ........................................... 92/261; 277/3
[58] Field of Search .................. 92/52, 53, 61, 62, 63, 92/65, 66, 67, 181 P, 187, 168, 165 R, 247, 163, 164, 182; 417/417; 277/3

[56] References Cited

U.S. PATENT DOCUMENTS

| 1,694,859 | 12/1928 | Laugaudin | 92/247 |
| 2,610,098 | 12/1952 | Reiners | 92/182 |
| 2,686,402 | 8/1954 | Samuel | 92/182 |
| 2,696,197 | 12/1954 | Forwald | 92/62 |
| 2,946,318 | 7/1960 | Rutherford | 92/62 |
| 4,569,641 | 2/1986 | Falk et al. | 417/417 |

Primary Examiner—Edward K. Look
Assistant Examiner—John Ryznic
Attorney, Agent, or Firm—Young & Thompson

[57] ABSTRACT

FIG. 1 shows a sealing arrangement which includes a mushroom-shaped piston is driven to reciprocate in a cylinder by an annular driving part extending around its stem. The driving part forms the "rotor" of a linear electric motor, the "stator" of which is provided by the cylinder. The ends of the piston are exposed to respective greater and lesser pressures. During movement of the driving member relative to the piston against the bias of a spring, fluid flow through a passage containing a one-way valve generates an overpressure in a chamber to which a seal between the piston head and the cylinder is exposed and thus prevents leakage of fluid around the seal. FIG. 2 shows a modification in which the piston has a central well containing a plunger biassed by a diaphragm. Here the overpressure is generated in the well and a passage exposes a seal to the overpressure to prevent leakage around the piston.

15 Claims, 1 Drawing Sheet

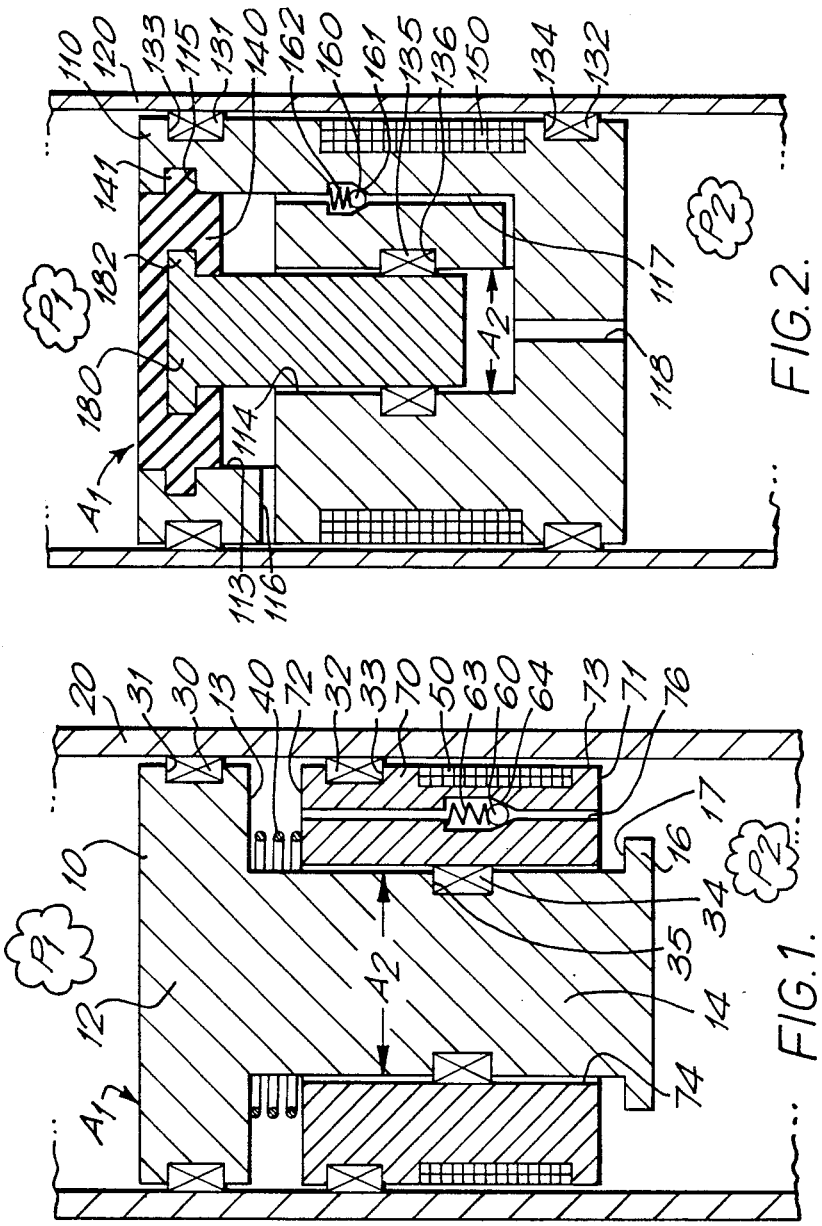

SEALING ARRANGEMENT

BACKGROUND TO THE INVENTION

1. Field of the Invention

This invention relates to the sealing of reciprocable members with respect to the cavities in which they are reciprocable.

2. Description of Prior Art

In many types of equipment and machinery the situation arises in which a member which is reciprocably-movable in a cavity is exposed to a first, higher fluid pressure on its first side and to a second, lower fluid pressure on its second side. This pressure differential produces a tendency for leakage to occur between the reciprocable member and the cavity wall and for fluid to flow from the first side of the piston to the second. The higher the pressure differential, the greater is this tendency. The leakage is a particular disadvantage if reasons exist for avoiding contamination of the second fluid by the first fluid, or other mixing of fluids. As an example, leakage is highly undesirable when the first fluid contains abrasive material which is to be excluded from the second fluid in order to protect other parts of the equipment with which the second fluid is in communication.

SUMMARY OF THE INVENTION

It is one object of the present invention to improve the seal effectiveness of reciprocable members with respect to their cavities and so overcome the disadvantageous effects mentioned above.

It is another object of the invention to provide a sealing arrangement in which reciprocal movement of a reciprocating member in a cavity generates an overpressure in a fluid occupying the cavity, the overpressure acting on a seal between the reciprocating member and the cavity wall to prevent leakage of fluid around the seal.

It is yet another object of the invention to provide a sealing arrangement as mentioned in the foregoing paragraph, in which the overpressure is generated by relative movement between driving and driven parts of the reciprocating member during at least a portion of the reciprocal movement.

It is a further object of the invention to provide a sealing arrangement as mentioned in any of the three foregoing paragraphs, in which the reciprocating movement is generated by a linear electric motor.

The invention provides an apparatus comprising a member which is reciprocable in a cavity, seal means operative between the member and the cavity walls, and drive means for producing reciprocal movement of the reciprocable member which, in use, is exposed at its opposite sides to fluids at respective first and second pressures, the first pressure being greater than the second pressure, the reciprocable member comprising a driving part, upon which the drive means act, and a driven part and the apparatus including means for generating during reciprocal movement of the member a fluid pressure in a chamber between the driving and driven parts, the pressure being greater than the first pressure and acting upon the seal means to provide an overpressure which prevents flow of the first fluid past the seal means and from one side of the reciprocal member to the other.

Advantageously, the means for generating the fluid pressure comprises a passageway communicating the pressure chamber with the second fluid and containing a one-way valve allowing fluid flow into the pressure chamber.

Preferably, the passageway extends through the driving part the reciprocable member.

In such arrangements, movement of the driving part of the reciprocable member relative to the driven part can be provided for, for example during an initial portion of each stroke of the reciprocal movement; such movement will generate the overpressure in the pressure chamber.

In further advantageous arrangements, resilient biassing means act between the driving and driven parts of the reciprocable member, movement of the driving part relative to the driven part taking place against the bias of these resilient means during reciprocal movement in at least one direction.

The resilient biassing means may take the form of, for example, a mechanical spring acting between the driving and driven parts or a resilient diaphragm or other member acting between the two parts.

Conveniently, the drive means comprise a linear electric motor, of which the reciprocable member can form the "rotor" and the cavity walls can form the "stator". In this way and in a preferred arrangement, the driving part of the reciprocable member includes coil means and the cavity walls include further coil means, the coil means being energisable to produce movement of the "rotor" relative to the "stator".

Preferably, the driving part of the reciprocable member comprises an annular portion which extends around at least a portion of the driven member.

Thus, the driving part may have an overall annular shape and the driven part may have a head portion which is of greater cross-section than a stem portion, around which the annular driving part extends.

In such a configuration, resilient means of the type mentioned above can conveniently take the form of a helical compression spring extending around the stem and acting between one end face of the driving part and the adjacent end face of the head portion of the driven part. Initial movement of the driving part thus involves movement relative to the driven part against the bias of the spring. Reciprocal movement in the opposite direction can be produced by engagement of the opposite end face of the driving part with a shoulder on the stem portion of the driven part.

When the driven part has head and stem portions as mentioned above, the seal means is conveniently located on the peripheral surface of the head portion facing the cavity wall.

In other configurations of the reciprocating mechanism, the driving part may have an annular portion, between which and the cavity wall the seal means may be operative, and a portion which extends across one end of the annular portion to form a well in which at least a portion of the driven part is located. In this configuration, resilient means can again be provided and take the form of a resilient diaphragm extending between the driven part and the driving part within the well, preferably adjacent its open end.

BRIEF DESCRIPTION OF THE DRAWING

Embodiments of the invention will now be described by way of example with reference to the drawing, in which:

FIG. 1 is a longitudinal sectional view of a first apparatus in which a member is reciprocable by a linear electric motor in a cylindrical cavity, and FIG. 2 is a view similar to FIG. 1 of a second such apparatus.

DESCRIPTION OF THE PREFERRED EMBODIMENTS

FIG. 1 shows a driven part in the form of a piston 10 which is slidable in a cylinder of circular cross-section defined by a cylinder wall 20. The piston 10 has a first, head portion 12 which is of larger cross-sectional area than a second, stem portion 14. An annular end face 13 of the head portion 12 is thus formed. An annular seal 30 is seated in a groove 31 in the cylindrical outer surface of the piston head portion 12 and forms a seal with the cylinder wall 20. The larger end face of the piston 10 has an area $A_1$ which is exposed to a first liquid at pressure $P_1$. The other end face of the piston has a lesser surface area which is approximately the cross-sectional area $A_2$ of the stem portion 14 and is exposed to a second liquid at pressure $P_2$. At its free end, the stem portion 14 of the piston 10 has an annular flange 16 which extends a short way towards the cylinder wall 20 and forms an annular shoulder 17 facing towards the piston head portion 12.

An annular driving part 70 extends around the piston stem portion 14 and is captive between the adjacent end face 13 of the piston head portion 12 and the annular shoulder 17 formed by the flange 16. A helical compression spring 40 acts between the head end face 13 and an adjacent end face 72 of the driving part to urge the driving part 70 and piston 10 apart. A first sealing ring 32, seated in a groove 33 in an outer cylindrical surface 73 of driving part 70 forms a seal between the driving part and the cylinder wall 20. A second sealing ring 34, seated in a groove 35 forms a seal between the piston stem portion 14 and an inner cylindrical surface 74 of the driving part 70.

The driving part 70 forms the "rotor" of a linear motor and, for this purpose, includes a rotor winding 50 of the motor. The stator of the motor is constituted by the cylinder wall 20 which accordingly includes a stator winding which, like other parts of the motor, is not shown.

The driving part 70 has an axially extending passage 76 which extends between the end faces 71, 72. The passage 76 contains a check valve member 60 which is biased by a compression spring 63 against a seating 64 formed in the passage.

The operation of the apparatus shown in FIG. 1 will now be described. It will be assumed that liquid pressures $P_1$ and $P_2$ act upon the reciprocable member and that the liquid $P_1$ is contaminated with a contaminant which should not pass around the seal 30.

The second fluid flows into the passageway 76, opens the valve 60, and flows into an overpressure chamber formed between the annular end face 13 of the piston head 12 and the end face 72 of the driving part 70. The pressure causing this flow will be the underpressure created by the spring 40 less the check valve pressure, provided that $P_1$ and $P_2$ are equal.

Upon energisation of the linear electric motor, the driving part 70 will, say, move downwards (as viewed in FIG. 1). From the position shown in FIG. 1, the first part of this stroke will involve relative movement between the driving part 70 and the piston 10 until the end face 71 of the driving part 70 comes into abutment with the shoulder 17 on the piston stem 14. Further movement of the driving part 70 under the influence of the linear motor will result in movement of the piston 10 in the same direction as the driving part. During this movement, further second fluid flows through the passageway 76 and ensures that the overpressure chamber is maintained full of the second fluid.

When the direction of movement of the driving element 70 is reversed, relative movement will take place between the driving part 70 and the piston 10, against the bias of the spring 40. This movement (upward in FIG. 1) of the driving part 70 results in a pressure $P_c$ being generated in the overpressure cavity. The pressure $P_c$ acts on the side of the seal 30 which would otherwise be exposed only to the pressure $P_2$. Flow of contaminated fluid around the seal 30 is thus prevented by the overpressure $P_c - P_1$.

If it is assumed that the area of the free end of the piston stem portion 14 is equal to $A_2$, it can be shown that $$P_c = (P_1 A_1 - P_2 A_2)/(A_1 - A_2)$$

and therefore that $P_c$ will always be greater than $P_1$, provided that $P_1$ is maintained higher than $P_2$.

The apparatus shown in FIG. 2 comprises a reciprocable member, formed by a piston 110, a plunger 180 and a diaphragm 140, and a cylinder defined by a cylinder wall 120 of circular cross-section. Annular seals 131, 132, seated in respective grooves 133, 134 in the outer cylindrical wall of the piston 110 form seals between the piston and the cylinder wall 120 adjacent the opposite ends of the piston 110.

The piston 110 is formed with a central well which is circular in cross-section and is stepped to provide an outer part 113 of greater cross-sectional area than an inner part 114. The well receives the plunger 180 between which and the cylindrical wall of the inner well part 114 an annular seal 135, seated in an annular groove 136 in the wall of the well, is operative. At its outer end, the plunger has a flange 182 which is received in a complementarily-shaped recess in a diaphragm 140 which is in turn attached and to the cylindrical wall of the outer well part 113 by engagement of an annular rib 141 on the diaphragm in a groove 115 in the wall of the well.

A radial passage 116 extends from the inner end of the outer well part 113 to the annular space between the seal 131, 132. A passageway 117 within the piston 110 extends from the inner end of the outer well part 113 to the inner end of the inner part 114 and contains a check valve 160 which is biased against a seating 161 by a compression spring 162. The inner end of the well is connected by a longitudinal bore 118 in the piston 110 to the second fluid at pressure $P_2$.

The piston 110 forms the "rotor" of a linear electric motor and includes a rotor coil 150. The cylinder wall 120 includes a stator coil (not shown).

As in FIG. 1, the piston 110 has an end face of surface area $A_1$ which is exposed to a first pressure $P_1$. The inner end of the plunger 180 has a surface area $A_2$ which is exposed to a second pressure $P_2$.

The apparatus shown in FIG. 2 functions similarly to that shown in FIG. 1. The passageway 117 and bore 118 allow the second fluid to flow into an overpressure chamber situated in the outer well part 113 and beneath the diaphragm 140. The pressure $P_c$ in this chamber is exerted on the seal 131 through the radial bore 116.

Energisation of the linear electric motor will, as in the FIG. 1 apparatus, cause reciprocal movement of the piston 110 as a driving part which drives the plunger 180 as a driven part through the diaphragm 140 which deforms resiliently during such movement. As in the FIG. 1 apparatus the pressure $P_c$ is given by $$P_c = (P_1 A_1 - P_2 A_2)/(A_1 - A_2)$$

provided that $P_1$ is greater than $P_2$. Undesirable flow of the first liquid around the seal 131 is thereby prevented by the overpressure $P_c - P_1$.

The modified versions of the apparatus described above, the linear motor driving means are replaced by rod-and-crank driving means, in which a rod is connected to the driving part 70 or 110.

It will be evident that those skilled in the art may make numerous modifications of the specific embodiments described above without departing from the present inventive concepts. It is accordingly intended that the invention shall be construed as embracing each and every novel feature and novel combination of features present in or possessed by the article herein described and that the foregoing disclosure shall be read as illustrative and not as limiting except to the extend set forth in the claims appended hereto.

I claim:

1. An apparatus comprising a member which is reciprocable in a cavity, seal means operative between the member and the cavity walls, and drive means for producing reciprocal movement of the reciprocable member which, in use, is exposed at its opposite sides to fluids at respective first and second pressures, the first pressure being greater than the second pressure, the reciprocable member comprising a driving part, upon which the drive means act, and a driven part and the apparatus including means for generating during reciprocal movement of the member a fluid pressure in a chamber between the driving and driven parts, the pressure being greater than the first pressure and acting upon the seal means to provide an overpressure which prevents flow of the first fluid past the seal means and from one side of the reciprocal member to the other.

2. An apparatus according to claim 1, in which the means for generating the fluid pressure comprise means for producing relative movement of the driving and driven parts of the reciprocable member and a passageway communicating the pressure chamber with the second fluid and containing a one-way valve allowing fluid flow into the pressure chamber during such relative movement.

3. An apparatus according to claim 2, in which the said relative movement takes place during an initial portion of the stroke of the reciprocable member.

4. An apparatus according to claim 2, in which the passageway extends through the driving part of the reciprocable member.

5. An apparatus according to claim 2, in which resilient biassing means act between the driving and driven parts of the reciprocable member, movement of the driving part relative to the driven part taking place against the bias of these resilient means during reciprocal movement in at least one direction.

6. An apparatus according to claim 5, in which the resilient biassing means comprise a mechanical spring action between the driving and driven parts.

7. An apparatus according to claim 5, in which the resilient biassing means comprise a resilient diaphragm acting between the driving and driven parts.

8. An apparatus according to claim 1, in which the driving part of the reciprocable member comprises an annular portion which extends around at least a portion of the driven member.

9. An apparatus according to claim 8, in which the driven part has a head portion which is of greater cross-section than a stem portion of the head portion, the annular driving part portion extending around the stem portion.

10. An apparatus according to claim 9, in which the seal means is operable between the peripheral surface of the head portion and the cavity wall adjacent thereto.

11. An apparatus according to claim 8, in which the driving part includes a portion which extends across one end of the annular portion to form a well in which at least a portion of the driven part is located.

12. An apparatus comprising a member which is reciprocable in a cavity, seal means operative between the member and the cavity walls, and drive means for producing reciprocal movement of the reciprocable member which, in use, is exposed at its opposite sides to fluids at respective first and second pressures, the first pressure being greater than the second pressure, the reciprocable member comprising an annular driving part, upon which the drive means act, and a driven part having a stem portion, around which the annular part extends, and a head portion, between which and the cavity wall the said seal means are operative, the driving and driven parts having between them a chamber in which an overpressure is generated during reciprocal movement of the reciprocable member, the overpressure chamber being sealed from the second fluid by further seal means operative between the driving and driven parts and the apparatus including a passageway which communicates the overpressure chamber with the second fluid and contains a one-way valve allowing fluid flow into the pressure chamber during movement of the driving part relative to the driven part against the bias of resilient biassing means acting between the head portion of the driven member and the driving member.

13. An apparatus comprising a member which is reciprocable in a cavity, seal means operative between the member and the cavity walls, and drive means for producing reciprocal movement of the reciprocable member which, in use, is exposed at its opposite sides to fluids at respective first and second pressures, the first pressure being greater than the second pressure, the reciprocable member comprising a driving part, between which and the cavity wall the said seal means are operative and upon which the drive means act, and a driven part, the driven part being received in a well defined by an annular portion of the driving part and being joined to the driving part by a resilient diaphragm, a chamber, in which an overpressure is generated during reciprocal movement of the reciprocable member, being defined within the well and being sealed by further seal means from a portion of the well communicating with the second fluid and thereby exposing the driven part to the second fluid pressure, the apparatus including a passageway communicating the overpressure chamber with the second fluid and containing a one-way valve allowing fluid flow into the pressure chamber during movement of the driving part relative to the driven part against the bias of the resilient diaphragm.

14. An apparatus according to claim 1, in which the drive means comprise a linear electric motor, of which the reciprocable member forms one element which is movable relative to the cavity wall which forms the other element.

15. An apparatus according to claim 14, in which the driving part of the reciprocable member includes coil means comprised in one element of the linear electric motor.

* * * * *